Dec. 6, 1955     O. NEUENSCHWANDER     2,726,344
SINGLE-PHASE ALTERNATING-CURRENT SHADED-POLE MOTOR
Filed Jan. 28, 1952     2 Sheets-Sheet 1

PRIOR ART

United States Patent Office 2,726,344
Patented Dec. 6, 1955

2,726,344

SINGLE-PHASE ALTERNATING-CURRENT SHADED-POLE MOTOR

Otto Neuenschwander, Kilchberg-Zurich, Switzerland

Application January 28, 1952, Serial No. 268,602

2 Claims. (Cl. 310—172)

In the past a large number of shaded-pole motors have appeared on the market which are all constructed in accordance with the same basic principle and all exhibit the same drawbacks, low lagging starting torque, pronounced heating-up, with relatively minimal specific power and very low efficiency.

They have therefore been used only in cases where these drawbacks were tolerable as being outweighed by the advantages of such motors, viz., constant R. P. M. speed, simplicity, and freedom from breakdown. These motors operate on the principle that an alternating magnetic field is split into two fractional fields both temporally and spatially displaced in respect of one another which act on a squirrel-cage rotor of the conventional type and therein generate a torque in the known manner. On the degrees of this splitting, or temporal and spatial displacement of the two fractional fields in relation to one another essentially depends, among other factors, the amount of torque, and therefore the overall effect. These basic conditions can be expressed by the familiar formula according to which the field axis angle $\alpha$ of the two fractional fields $\phi 1$ and $\phi 2$ should be: $\alpha = 180° - \psi$, in which $\psi$ represents the phase-displacement between the two fractional fields. A further requirement is that the fractional fields should be interlinked in order to achieve a favourable effect. These four basic conditions have been met to a limited extent only, or not at all, in the motors so far disclosed, hence their aforementioned drawbacks.

The object of the present invention is to provide a shaded-pole motor in which the aforesaid defects are eliminated, so that these motors acquire a higher starting torque and are of relatively high efficiency.

The most essential features of this motor are represented on a fairly large scale in Figs. 1 to 8 of the accompanying drawings.

Figure 1:
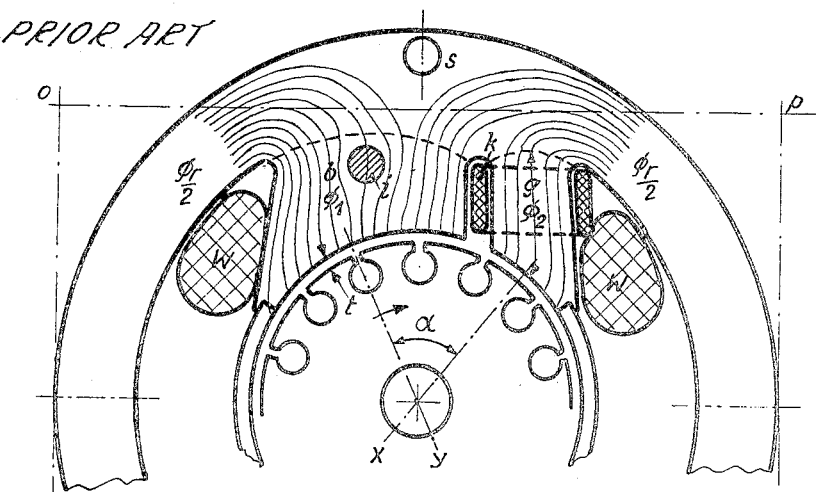
Fig. 1 is a cross-sectional view of the stator and rotor of a motor of the type hitherto usual.

Fig. 1 shows the disposition of the magnetic fluxes hitherto generally practised in the design of shaded-pole motors. Arranged about one-third of the way along the width of the pole neck is a radial slot which separates the auxiliary pole, with the short-circuit winding $k$, from the main pole. The magnetic flux $\phi r$ from the two yokes, generated by the primary winding $w$, divides in the pole neck zones $b$ and $g$, in accordance with the magnetic resistances, into the fractional fields $\phi 1$ and $\phi 2$. The magnetic resistance in the free, unshaded pole neck zone $b$ is very small, as the cross-sectional area of the said zone is even greater than that of the two yokes together. On the other hand, the air resistance of the gap $t$ has hitherto been made very great in order to ensure that a portion of the magnetic flux $\phi r$ would enter the shaded auxiliary pole zone $g$ at all and there generate the phase-shifted flux $\phi 2$. Owing to this disposition of the pole neck zone and to the large air gap $t$, the phase-displacement between the fractional fields $\phi 1$ and $\phi 2$ is only very small, however, as is also the field axis angle $\alpha$, which is less than 90°, which should be its minimum value. Moreover, the two fractional fields are not interlinked, and the consequence of this is the drawbacks already referred to.

Figure 2:
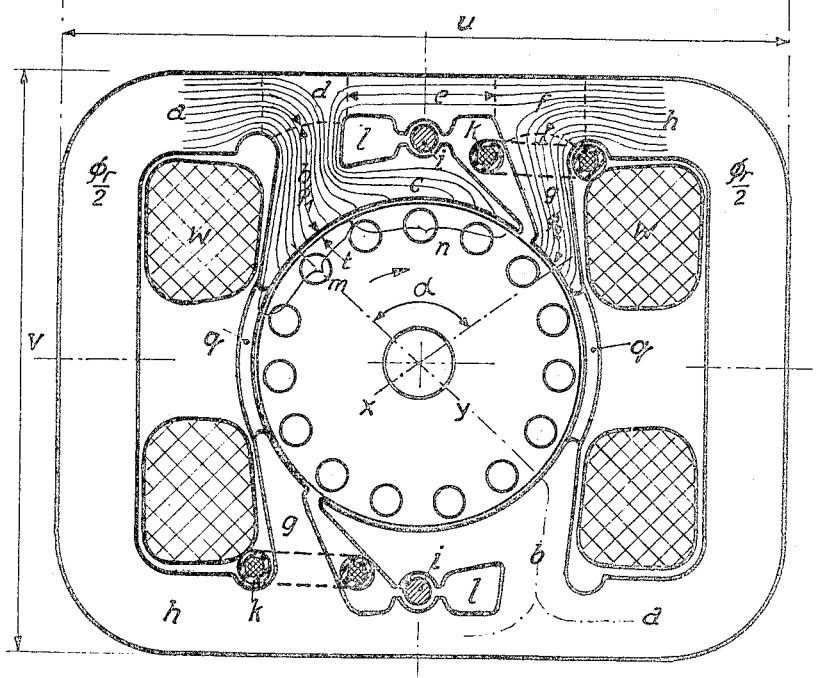
Fig. 2 is an equivalent cross-sectional view of a new motor, of the same order of size, in accordance with the invention.

Fig. 2 distinctly shows the magnetic conditions, on the same scale, in a new motor constructed in accordance with the present invention. As this figure shows, a so-called magnetic isthmus or bottleneck $b$ is provided, in addition to the pole slot disposed tangentially in respect of the rotor, in the free, unshaded part of the pole neck, by means of a recess $l$, which isthmus or bottleneck fundamentally changes the conditions of magnetic flux or tension.

The left-hand fraction $\phi r/2$ flows from the yoke zone $a$ into zone $d$ and thence through the bottleneck $b$ to the main-pole face $m$—$n$. To this fractional flux is added a portion of the right-side flux $\phi r/2$ from zone $h$ via zones $f$ and $e$, so that magnetic saturation in the isthmus or bottleneck $b$ is driven to a very high level, i. e., far above the knee limit of the magnetization curve. As a result, permeability $\mu$ in zone $b$ drops to such an extent that a magnetic pocket or accumulation is built up, after which the major part of $\phi r/2$ develops with a considerable time-lag in zone $g$ of the auxiliary pole, thereby fulfilling the object of the invention. The result, then, is that the free main-pole neck zone $b$ is fully saturated immediately on the commencement of the rising M. M. F. of a half-cycle and, with a considerable time lag $\psi$, the auxiliary zone $g$ likewise, in which a much stronger flux now occurs than formerly. As the M. M. F. of the first half-cycle diminishes, the process takes place in reverse, which is very desirable and approaches very closely to the functioning of a conventional two-phase winding. As a result, however, not only is the angle of phase difference $\psi$ between the two fractional fluxes $\phi 1$ and $\phi 2$ brought closer to 90°, but owing to the novel disposition of the pole slot and of the recess $l$, the field axis angle between $x$ and $y$, $\alpha$ is forced open to more than 90°, and in this way the fundamental condition, mentioned in the preamble, relating to the spatial and temporal angles of the fractional fields, is met for all practical purposes. An important preliminary condition is, of course, the nature and dimensioning of the recess $l$ in the pole neck, which recess may have, for instance, the form represented in Fig. 2. The bottleneck, which plays the main part, could also be achieved by other means, for instance by contracting the free pole neck, or by other perforations.

Through the fact that the splitting of the primary field $\phi r$ into two fractional fields $\phi 1$ and $\phi 2$ takes place almost exclusively in the active material of the pole neck, it is not only necessary, but in fact very important, to make the air gap $t$ between stator and rotor as small as possible consistently with mechanical or manufacturing requirements. In this way not only is the bottleneck action hereinbefore described supported, but also the number of ampere-turns on the stator for magnetizing the air gap is substantially reduced, with the result that copper-losses also are considerably diminished.

As already mentioned, it is important that the main pole field and the auxiliary pole field should be magnetically interlinked, i. e., should be able to overlap one another. In shaded-pole motors of conventional design this was never achieved. Tests have shown that by sufficient skewing of the squirrel-cage winding in the rotor, equivalent to approximately one main-pole pitch, the same effect is achieved as by the interlinking of the field coils in polyphase motors.

Figure 3:
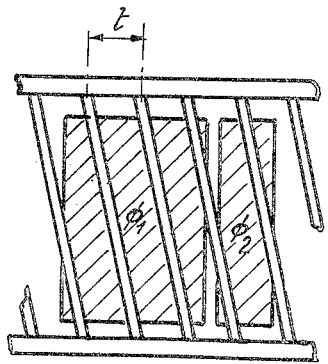
Fig. 3 shows the disposition of the rotor cage winding as hitherto practised.

Fig. 3 shows by way of example the skewing of the squirrel-cage winding now usual in conventional shaded-pole motors, by one to two slot pitches $t$. All that was achieved thereby was compensation of the fluctuations of magnetic reluctance deriving from the rotor slots.

Figure 4:
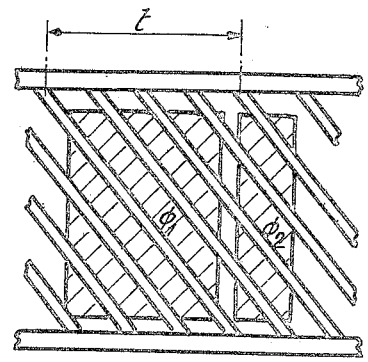
Fig. 4 shows the disposition of this winding in the new motor.
Figure 5:
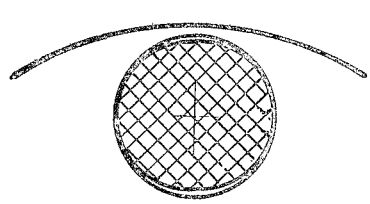
Fig. 5 shows an embodiment of the rotor slot.

Fig. 4 shows the skewing of the squirrel-cage winding in the new motor, corresponding approximately to the main pole arc H, so that a number of squirrel-cage bars simultaneously cover the faces of the main and the auxiliary pole. Interlinking is thus achieved in the simplest conceivable manner. Such pronounced skewing of the squirrel-cage winding is not, in practice, possible without certain difficulties, because of large clamping and frictional resistances. However, a slot shaped as shown in Fig. 5 proves particularly suitable for this purpose, and has the great advantage of imposing the least restriction on the passage of the magnetic flux, which is also a very important point.

Figure 6:
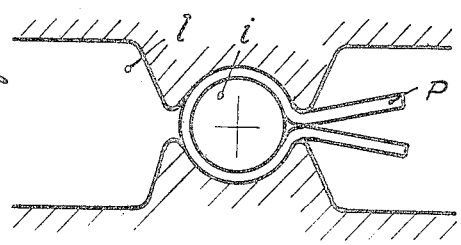
Fig. 6 shows a laminated-pack rivet insulation.

Investigations have shown that the conventional uninsulated short-circuit windings of the auxiliary poles, and also the laminated-pack rivets, can easily produce unintended short-circuit windings in the stator by conductingly connecting, in particular, the two extreme laminations of the stator pack and are then induced by the alternating stator field pulsating through them, so that undesired supplementary short-circuit currents are produced. Such currents may even achieve relatively substantial proportions, and are partly to blame for the characteristic drawbacks of these motors to which reference was made in the preamble. It is therefore absolutely essential, contrary to the general practice, carefully to insulate the short-circuit windings and the laminated-pack rivets. Fig. 6 shows how a laminated-pack rivet can be insulated from the stator by means of a strip of paper P.

Fig. 1 shows a conventional two-pole stator embodiment in circular form, and Fig. 2 shows a rectangular form of the same order of magnitude (same rotor diameter). It will be seen that the latter form is the more satisfactory because it affords much more space for the accommodation of the primary winding, with the result that the resistance of the latter can be reduced almost to half for the same number of turns. This again results in the copper-losses being greatly reduced, and at the same time the quantity of material required for the production of a stator lamination with the same pole bore is reduced by about 20%. A ratio of 1:1.2, with deviations of ±10%, has proved particularly satisfactory. In this embodiment, moreover, surface cooling is specially promoted and the incorporaiton of the motor in many cases facilitated.

What I claim is:

1. In an induction motor of the shaded pole type, a squirrel cage rotor, a laminated stator surrounding said rotor, said stator having a yoke and poles extending inwardly from said yoke toward said rotor, each pole being provided with an angular slot dividing said pole into a main pole and a shaded pole, said slot extending from the inner face of said pole substantially tangentially with respect to the rotor and subdividing the face of said pole into a narrow pole face for said shaded pole and into a substantially wider pole face for said main pole, said slot extending with a portion thereof substantially parallel to the face of the main pole and in rear thereof to such an extent that the neck of the main pole where it connects with the yoke will be positioned a substantial distance away from the neck of the shaded pole.

2. In an induction motor of the shaded pole type, a squirrel cage rotor, a laminated stator surrounding said rotor, said stator having a yoke and poles extending inwardly from said yoke toward said rotor, each pole being provided with an angular slot dividing said pole into a main pole and a shaded pole, said slot extending from the inner face of said pole substantially tangentially with respect to the rotor and subdividing the face of said pole into a narrow pole face for said shaded pole and into a substantially wider pole face for said main pole, said slot extending with a portion thereof substantially parallel to the face of the main pole and in rear thereof to such an extent that the neck of the main pole where it connects with the yoke will be positioned a substantial distance away from the neck of the shaded pole, the cross-sectional area of the neck of the main pole being less than the sum of the appurtenant cross-sectional areas of the yoke.

References Cited in the file of this patent

UNITED STATES PATENTS

| | | |
|---|---|---|
| 1,408,890 | Kimble | Mar. 7, 1922 |
| 1,823,979 | Jordan | Sept. 22, 1931 |
| 1,884,140 | Nickle | Oct. 25, 1932 |
| 1,897,184 | Zopp | Feb. 14, 1933 |
| 1,951,230 | Alexander | Mar. 13, 1934 |
| 2,027,846 | Suits | Jan. 14, 1936 |
| 2,071,224 | Ballentine | Feb. 16, 1937 |
| 2,149,569 | Barrett | Mar. 7, 1939 |
| 2,591,117 | Ballentine | Apr. 1, 1952 |

FOREIGN PATENTS

| | | |
|---|---|---|
| 6,267 | Australia | Feb. 24, 1932 |
| 42,869 | France | Aug. 28, 1933 |
| | (Addition to No. 732,172.) | |
| 423,037 | Great Britain | Jan. 21, 1935 |